United States Patent
Koseki et al.

Patent Number: 6,068,909
Date of Patent: May 30, 2000

[54] BIAXIALLY ORIENTED LAMINATE POLYESTER FILM

[75] Inventors: Masafumi Koseki; Toshifumi Osawa; Teyasu Kobayashi, all of Sagamihara, Japan

[73] Assignee: Teijin Limited, Osaka, Japan

[21] Appl. No.: 08/963,618

[22] Filed: Nov. 4, 1997

[30] Foreign Application Priority Data

Nov. 14, 1996 [JP] Japan ................... 8-302920

[51] Int. Cl.$^7$ ............... B32B 5/16; B32B 5/22; B32B 27/06; B32B 27/20

[52] U.S. Cl. ............ 428/141; 428/213; 428/220; 428/323; 428/337; 428/402; 428/480; 428/900; 428/910; 428/332

[58] Field of Search ............ 428/141, 212, 428/213, 220, 323, 337, 402, 480, 483, 900, 910, 332

[56] References Cited

U.S. PATENT DOCUMENTS

| | | | |
|---|---|---|---|
| 5,069,962 | 12/1991 | Okazaki et al. | 428/323 |
| 5,516,574 | 5/1996 | Ogawa et al. | 428/143 |
| 5,670,236 | 9/1997 | Kotani et al. | 428/141 |

FOREIGN PATENT DOCUMENTS

| | | |
|---|---|---|
| 0347646 A2 | 12/1989 | European Pat. Off. . |
| 0502745 A2 | 9/1992 | European Pat. Off. . |
| 277431 | 3/1990 | Japan . |

OTHER PUBLICATIONS

Mark et al., Encyclopedia of Polymer Science and Engineering, vol. 12, p. 212, Oct. 1989.

*Primary Examiner*—Paul Thibodeau
*Assistant Examiner*—Ramsey Zacharia
*Attorney, Agent, or Firm*—Sughrue, Mion, Zinn Macpeak & Seas, PLLC

[57] ABSTRACT

A biaxially oriented polyester film has a first layer of an aromatic polyester containing inert fine particles having an average particle diameter of 1.0 $\mu$m or less in an amount of 0.01 to 2% by weight and a second layer of an aromatic polyester. The ratio (t/d) of the thickness t of the first layer to the average particle diameter d of the inert fine particles is 5 to 30. The exposed surface of the first layer has a dynamic friction coefficient ($\mu k_1$) against a metal of 0.15 to 0.50, the exposed surface of the second layer has a dynamic friction coefficient ($\mu k_2$) against a metal of 0.24 to 0.60, and the ratio $\mu k_2/\mu k_1$ is 1.2 to 4.0. The film has a thickness of 2 to 8 $\mu$m.

16 Claims, 1 Drawing Sheet

BIAXIALLY ORIENTED LAMINATE POLYESTER FILM

BACKGROUND OF THE INVENTION

1. Field of the Invention

This invention relates to a biaxially oriented laminate polyester film. More specifically, it relates to a biaxially oriented laminate polyester film useful for a magnetic tape, particularly a digital recording magnetic tape, having stable running properties and excellent magnetic output characteristics.

2. Description of the Related Art

JP-A 2-77431 (the term "JP-A" as used herein means an "unexamined published Japanese patent application") discloses a biaxially oriented laminate polyester film having a specific relationship between the thickness of a polyester layer and the particle diameter of fine particles contained in the polyester layer.

In recent years, a large number of digital recording magnetic tapes have been made available and the thickness of a magnetic layer or a back coated layer has been further reduced to cut down the production costs of a magnetic tape. Due to the reduction in thickness, the surface properties of the magnetic tape is much more affected by the surface properties of a base film than before.

The magnetic tape runs through a complicated running system at the time of recording or reproduction in most of its systems. If the running properties of the magnetic tape are not balanced at a contact portion of the surface of a magnetic layer or back coated layer, such a defect as a track deviation or the like occurs. For example, in a DLT (digital linear tape), when the running properties of the tape are not balanced at a contact portion of the surface of a magnetic layer or back coated layer, a defect called "LTM (lateral tape motion)" occurs.

It is an object of the present invention to provide a biaxially oriented polyester film which overcomes the above problem, has stable running properties when a magnetic tape is formed therefrom, and is useful as a base film for a magnetic tape having a high S/N (signal/noise) ratio (may be also referred to as "excellent output characteristics" hereinafter).

It is another object of the present invention to provide a magnetic tape which comprises the above film of the present invention as a base film.

Other objects and advantages of the present invention will become apparent from the following description.

BRIEF SUMMARY OF THE INVENTION

According to the present invention, firstly, the above objects and advantages of the present invention can be attained by a biaxially oriented laminate polyester film:

(A) which comprises a first layer of an aromatic polyester which contains inert fine particles having an average particle diameter of 1.0 μm or less in an amount of 0.01 to 2% by weight and a second layer of an aromatic polyester, the ratio (t/d) of the thickness t (μm) of the first layer to the average particle diameter d (μm) of the inert fine particles being 5 to 30,;

(B) in which the dynamic friction coefficient ($\mu k_1$) against a metal of the exposed surface of the first layer being 0.15 to 0.50, the dynamic friction coefficient ($\mu k_2$) against a metal of the exposed surface of the second layer being 0.24 to 0.60, the ratio $\mu k_2/\mu k_1$ being 1.2 to 4.0; and (C) which has a thickness of 2 to 8 μm.

DETAILED DESCRIPTION OF THE INVENTION

Figure 1:
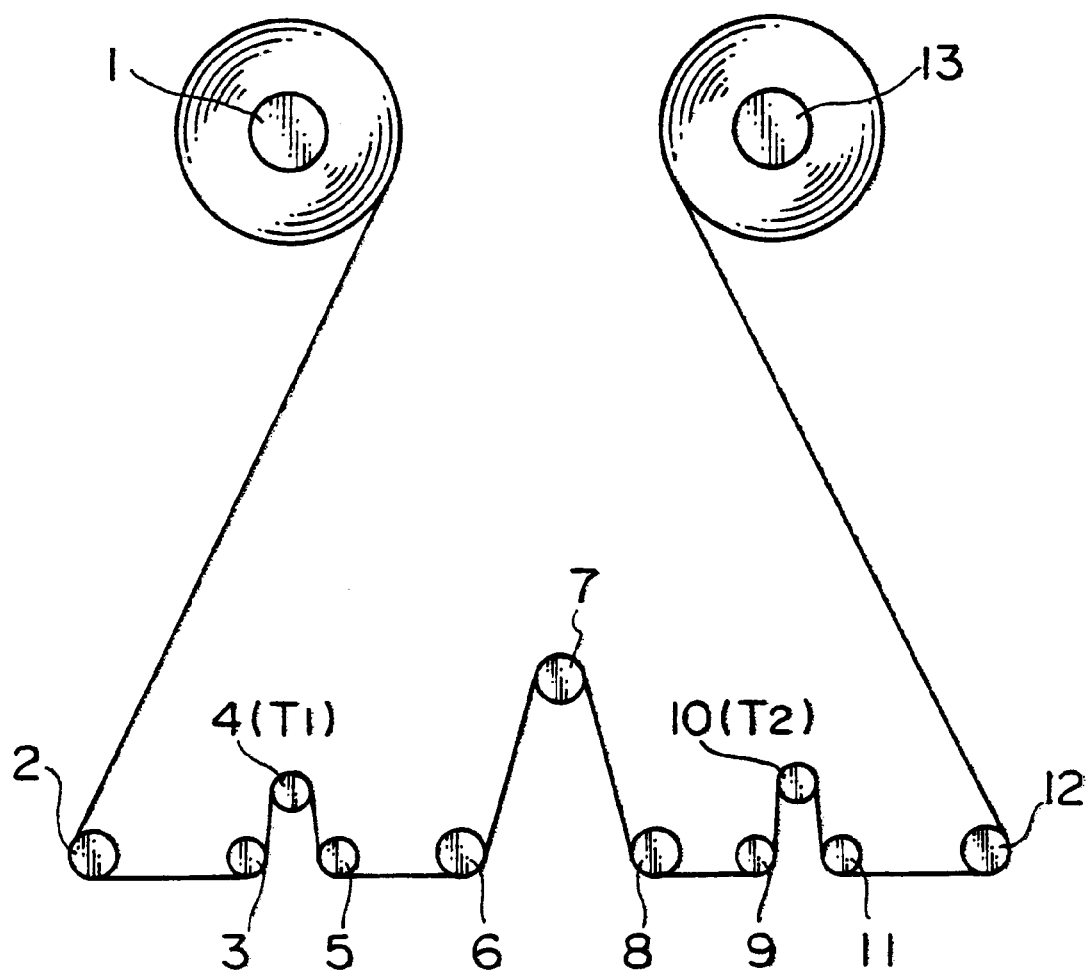
FIG. 1 schematically shows an apparatus for measuring a running friction coefficient of the biaxially oriented laminated polyester film of the present invention.

The aromatic polyester of the first layer forming the film of the present invention comprises an aromatic dicarboxylic acid as a main acid component preferably in an amount of 80 mol % or more and an aliphatic glycol as a main glycol component preferably in an amount of 80 mol % or more. This polyester is substantially linear and has film-forming properties, especially film-forming properties by melt molding. Illustrative examples of the aromatic dicarboxylic acid include terephthalic acid, 2,6-naphthalenedicarboxylic acid, isophthalic acid, diphenoxyethanedicarboxylic acid, diphenyldicarboxylic acid, diphenyletherdicarboxylic acid, diphenylsulfonedicarboxylic acid, diphenylketonedicarboxylic acid, anthracenedicarboxylic acid and the like. Illustrative examples of the aliphatic glycol include polymethylene glycols having 2 to 10 carbon atoms such as ethylene glycol, trimethylene glycol, tetramethylene glycol, pentamethylene glycol, hexamethylene glycol, decamethylene glycol and the like; and alicyclic diols such as 1,4-dicyclohexane dimethanol.

Out of these aromatic polyesters, polyesters comprising terephthalic acid and/or 2,6-naphthalenedicarboxylic acid as a main acid component(s) and a polymethylene glycol as a main glycol component are preferred, and polyethylene terephthalate, polyethylene-2,6-naphthalate and a copolymer comprising terephthalic acid and/or 2,6-naphthalenedicarboxylic acid in a proportion of 80 mol % or more of the whole dicarboxylic acid component and ethylene glycol in a proportion of 80 mol % or more of the whole glycol component are particularly preferred. In the case of the copolymer, 20 mol % or less of the whole acid component can be any of the above-described aromatic dicarboxylic acids other than terephthalic acid and/or 2,6-naphthalenedicarboxylic acid; an aliphatic dicarboxylic acid such as adipic acid or sebacic acid; an alicyclic dicarboxylic acid such as cyclohexane-1,4-dicarboxylic acid; or the like. 20 Mol % or less of the whole glycol component can be any of the above-described glycols other than ethylene glycol; an aromatic diol such as hydroquinone, resorcin or 2,2-bis(4-hydroxyphenyl)propane; an aliphatic diol having an aromatic ring such as 1,4-dihydroxydimethylbenzene; a polyalkylene glycol (polyoxyalkylene glycol) such as polyethylene glycol, polypropylene glycol or polytetramethylene glycol; or the like.

The above aromatic polyester includes those copolymerized with or bonded to a component derived from oxycarboxylic acid such as an aromatic hydroxy acid exemplified by hydroxybenzoic acid or aliphatic hydroxy acid exemplified ω-hydroxycaproic acid in a proportion of 20 mol % or less based on the total amount of dicarboxylic acid components and oxycarboxylic acid components.

The aromatic polyester includes also those copolymerized with a polycarboxylic acid having three or more functional groups or a polyhydroxy compound such as trimellitic acid or pentaerythritol in such an amount that it is substantially linear, for example, in an amount of 2 mol % or less of the whole acid component.

The aromatic polyester is known per se and can be produced by a method known per se. The above aromatic polyester preferably has an intrinsic viscosity, measured at 35° C. in an o-chlorophenol solution, of 0.4 to 0.9 dl/g, more preferably 0.5 to 0.7 dl/g, particularly preferably 0.55 to 0.65 dl/g.

The aromatic polyester contains inert fine particles having an average particle diameter of 1.0 μm or less in an amount of 0.01 to 2% by weight. The inert fine particles can consist of at least one kind of fine particles. When the inert fine particles consist of two or more different fine particles, they can be formed from a plurality of different chemical sources or a single chemical source having a plurality of peaks in a particle size distribution.

When the content of the inert fine particles is less than 0.01% by weight, a film having desired friction properties cannot be obtained and the wind-up properties of the resulting film deteriorate. On the other hand, when the content is more than 2% by weight, a film having desired friction properties cannot be obtained and the surface of the resulting film is extremely roughened, thereby degrading abrasion resistance and output characteristics disadvantageously. The preferred content of the inert fine particles is 0.5 to 1% by weight.

When the inert fine particles consist of two or more different fine particles, it is desirable that at least one kind of fine particles are particles having a particle diameter ratio (major diameter/minor diameter) of 1.0 to 1.3 and in particular, are of spherical shape, because output characteristics are further improved advantageously.

The inert fine particles preferably have a relative standard deviation of 0.6 or less, more preferably 0.5 or less. In this case, output characteristics are further improved.

Illustrative examples of the inert fine particles having the above preferred particle characteristics include substantially spherical silica particles, crosslinked divinylbenzene particles, crosslinked silicone resin particles and the like. Other particles such as calcium carbonate, alumina and titanium dioxide particles may be also used as the inert fine particles in the present invention.

The average particle diameter d ($\mu$m) of the inert fine particles contained in the first layer and the thickness t ($\mu$m) of the first layer must have the following relationship.

$$t/d = 5 \text{ to } 30$$

If the ratio (t/d) is less than 5, the particles will be easy to fall off and the resulting film will be liable to be abraded. On the other hand, if the ratio is more than 30, the surface opposite to the first layer of the second layer will be undulated by the particles contained in the first layer, thereby deteriorating the output characteristics of a magnetic tape formed therefrom. The ratio (t/d) is preferably 11 to 25.

The thickness of the first layer is preferably in the range of 0.5 to 3 $\mu$m, more preferably 0.6 to 2.5 $\mu$m.

Illustrative examples of the aromatic polyester of the second layer forming the film of the present invention are the same as those listed for the aromatic polyester forming the first layer. It should be understood that what is not described for the second layer is the same as that for the first layer.

The aromatic polyester of the second layer may contain or may not contain inert fine particles. When it contains inert fine particles, it preferably contains inert fine particles having an average particle diameter of 0.005 to 1 $\mu$m in an amount of 0.001 to 0.3% by weight.

When the aromatic polyester contains the inert fine particles as described above, a film formed therefrom has a better friction coefficient and is rolled in a better shape. Preferred examples of the inert fine particles are the same as those listed for the inert fine particles contained in the first layer. The inert fine particles contained in the first layer and those contained in the second layer may be the same or different in kind and size.

The average particle diameter of the inert fine particles is more preferably 0.05 to 0.6 $\mu$m and the content thereof is more preferably 0.005 to 0.2% by weight, particularly preferably 0.005 to 0.1% by weight.

In the second layer, the relationship required for the first layer between the average particle diameter of the inert fine particles contained in the layer and the thickness of the layer is not necessary.

The film thickness of the second layer is preferably in the range of 1.0 to 7.5 $\mu$m.

The exposed surfaces of the first and second layers of the film of the present invention have the following dynamic friction coefficients against a metal and the following relationship.

dynamic friction coefficient ($\mu k_1$) of first layer=0.15 to 0.50 dynamic friction coefficient ($\mu k_2$) of second layer=0.24 to 0.60

$\mu k_2 / \mu k_1 = 1.2$ to 4.0

If $\mu k_1$, $\mu k_2$ and $\mu k_2/\mu k_1$ do not satisfy the above conditions at the same time, the running of the resulting magnetic tape will become unstable and hence, output characteristics thereof will deteriorate disadvantageously. Here, the metal is SUS (=stainless steel) and used at the portion (such as a guide pin or magnetic head) that comes contact with a magnetic tape in the running system of the hardware.

$\mu k_1$ is preferably in the range of 0.25 to 0.48 and $\mu k2$ is preferably in the range of 0.30 to 0.50.

The film of the present invention has a thickness of 2 to 8 $\mu$m, preferably 2 to 7 $\mu$m.

Preferably, the biaxially oriented laminate polyester film of the present invention has a center plane average surface roughness $WRa^2$ of the second layer of 0.1 to 7 nm and a center plane average surface roughness $WRa^1$ of the first layer of 4 to 10 nm.

The center plane average surface roughness WRa is measured under such conditions as a measurement magnification of 40× and a measurement area of 242 $\mu$m×239 $\mu$m (0.058 mm$^2$) using a non-contact 3-D roughness meter (TOPO-3D) of WYKO Co., Ltd.

If the above center plane average surface roughnesses $WRa^1$ and $WRa^2$ are outside the above ranges, the balance between the friction coefficients against a metal of the surface of the first layer and the friction coefficients against a metal of the surface of the second layer will be lost, thereby exerting an unfavorable influence on the running properties of the resulting film and degrading output characteristics thereof disadvantageously.

The biaxially oriented laminate polyester film of the present invention is produced and traded in a form of long size.

Preferably, the biaxially oriented laminate polyester film has a Young's modulus of 400 kg/mm$^2$ to 2,000 kg/mm$^2$ in each of the longitudinal (machine) direction (MD) and the transverse direction (TD). If this Young's modulus is less than 400 kg/mm$^2$, the contact pressure between a magnetic tape and a magnetic head will be insufficient, thereby deteriorating the electromagnetic conversion characteristics of the film disadvantageously. If the Young's modulus is more than 2,000 kg/mm$^2$, the film-forming properties of the film will deteriorate disadvantageously. Particularly preferably, the Young's modulus in MD is 400 to 900 kg/mm$^2$ and the Young's modulus in TD is 550 to 1,500 kg/mm$^2$.

The film of the present invention having a Young's modulus within above ranges and having either the Young's modulus in a longitudinal direction being the same or larger than the Young's modulus in a transverse direction or the Young's modulus in a transverse direction being larger than the Young's modulus in a longitudinal direction can be provided according to required characteristics.

The biaxially oriented laminate polyester film of the present invention can be produced by a conventionally known method or a method accumulated by the industry. For example, the film can be obtained by first producing an unstretched laminate film and then biaxially orienting the film. The unstretched laminate film can be produced by a heretofore accumulated method for producing a laminate film. For example, there can be used a method for laminating together a first layer and a second layer forming the opposite surface thereof in a state where polyesters are molten or solidified by cooling. Stated more specifically, the laminate film can be produced by such a method as coextrusion, extrusion lamination or the like. The laminate film produced by the above method can be formed into a biaxially oriented film in accordance with a heretofore accumulated method for producing a biaxially oriented film. For example, an unstretched laminate film is obtained by melting and coextruding a polyester at a temperature between a melting point (Tm:° C.) and (Tm+70)° C. Then, the unstretched laminate film is stretched in a uniaxial direction (longitudinal or transverse direction) by 2.5 times or more, preferably 3 times or more at a temperature between (Tg−10) and (Tg+70)° C. (Tg: glass transition temperature of a polyester) and then stretched in a direction perpendicular to the above direction by 2.5 times or more, preferably 3 times or more at a temperature between Tg and (Tg+70)° C. Further, as required, the biaxially oriented film may be further stretched in a longitudinal and/or transverse direction(s). The total stretch ratio is preferably 9 times or more, more preferably 12 to 35 times, particularly preferably 15 to 25 times, in terms of area stretch ratio. Further, the biaxially oriented film can be heat-set at a temperature between (Tg+70) and (Tm−10)° C., for example, at a temperature of 180 to 250° C. The heat-setting time is preferably 1 to 60 seconds.

The biaxially oriented laminate polyester film of the present invention having a back coated layer formed on the exposed surface of the first layer and a magnetic layer formed on the exposed surface of the second layer is advantageously used when a magnetic tape is formed therefrom.

The biaxially oriented laminate polyester film of the present invention is preferably used as a base film for a magnetic tape, particularly a base film for a digital recording magnetic tape, owing to the above characteristics.

Therefore, according to the present invention, there is also provided a magnetic tape comprising the biaxially oriented laminate polyester film of the present invention and a magnetic layer formed on the second layer of the film.

The magnetic tape of the present invention is produced by uniformly dispersing needle-like fine magnetic powders of iron or essentially composed of iron into an organic binder such as vinyl chloride or vinyl chloride-vinyl acetate copolymer, coating the resulting dispersion onto the exposed surface of the second layer so as to have a magnetic layer thickness of 2 μm or less, preferably 0.1 to 1.0 μm, in terms of a solid content, to form a magnetic layer, and further forming a back coated layer on the exposed surface of the first layer by a known method. This method provides a high-density recording metal-coated magnetic tape having excellent output characteristics at a short-wavelength range, electromagnetic conversion characteristics such as S/N and C/N and a small error rate and almost free of a drop-out. As required, a non-magnetic layer containing titanium oxide fine particles or the like can be dispersed in the same organic binder as that for the magnetic layer and coated, as an underlying layer for the metal powder-containing magnetic layer, on the exposed surface of the second layer. This metal coated magnetic tape is extremely useful for 8 mm video, Hi8, β-cam SP and W-VHS for analog signal recording and digital video cassette recorders (DVC), 8 mm data recorder, DDSIV data recorder, digital β-cam, D2, D3, SX for digital signal recording.

The magnetic tape of the present invention can also be produced by uniformly dispersing needle-like magnetic fine powders such as iron oxide or chromium oxide or sheet-like magnetic fine powders such as barium ferrite into an organic binder such as vinyl chloride or vinyl chloride-vinyl acetate copolymer, coating the resulting dispersion onto the exposed surface of the second layer so as to have a magnetic layer thickness of 2 μm or less, preferably 0.1 to 1.0 μm, in terms of a solid content, to form a magnetic layer and further forming a back coating layer on the exposed surface of the first layer by a known method. This method provides a high-density recording oxide-coated magnetic tape having excellent output characteristics at a short-wavelength range, electromagnetic conversion characteristics such as S/N and C/N, a small error rate and almost free of a drop-out. A non-magnetic layer may be formed on the exposed surface of the second layer as required as an underlying layer for the oxide magnetic powder-containing magnetic layer by dispersing titanium oxide fine particles into the same organic binder as that of the magnetic layer and coating the resulting dispersion. This oxide-coated magnetic tape is useful as a high-density oxide magnetic recording medium for QIC, DLT for data streamers for digital signal recording.

Recording on the magnetic tape of the present invention is advantageously carried out on linear tracks.

The following examples are given to further illustrate the present invention.

Values of physical properties and characteristic properties in the present invention are measured and defined as follows.

(1) Average Particle Diameter of Particles

A polyester is removed from the exposed surface of a film by a plasma low-temperature incineration device (for example, PR-3 model manufactured by Yamato Kagaku Co., Ltd) to expose particles. Such treatment conditions that the polyester is incinerated but particles are not damaged are selected. The particles are observed through an SEM (scanning electron microscope), an image (graduation of shade of light produced by the particles) of the particles is linked to an image analyzer, and the following numerical processing is carried out with 5,000 or more particles observed at different sites to obtain a number average particle diameter (d) as an average particle diameter.

$$d=\Sigma di/n$$

wherein di is a circle equivalent diameter (μm) of a particle and n is a number of particles.

(2) Content of Particles

Sample particles are dissolved in a solvent which dissolves a polyester but not particles, the particles are separated from the solution by centrifugation, and the ratio (wt %) of the particles to the total weight is taken as the content of particles.

(3) Non-contact 3-D Center Plane Average Roughness WRa

This is measured under such conditions as a measuring magnification of 40× and a measurement area of 242×239 μm (0.058 mm$^2$) using a non-contact 3-D roughness meter (TOPO-3D) of WYKO Co., Ltd. WRa is calculated from the following equation based on surface analysis using software built in the roughness meter and an output value from the meter is used.

$$WRa = \sum_{k=1}^{M}\sum_{j=1}^{N}|Z_{jk} - \overline{Z}|/(M \cdot N)$$

wherein, $$\overline{Z} = \sum_{k=1}^{M}\sum_{j=1}^{N}Z_{jk}/(M \cdot N)$$

$Z_{jk}$ is a height on a 2-D roughness chart at a j-th position and a k-th position in each of a measurement direction (242 μm) and a direction (239 μm) perpendicular to the measurement direction when these directions are divided into M divisions and N divisions, respectively.

(4) Thickness of First Layer

Using a secondary ion mass spectrograph (SIMS), the concentration ratio ($M^+/C^+$) of an element derived from the highest-concentration particle out of particles contained in a portion of up to a depth of 3,000 nm from the surface of the film to the carbon element of the polyester is taken as a particle concentration and analysis in a thickness direction up to a depth of 3,000 nm from the surface is carried out. The particle concentration is low in the surface layer because it is an interface but grows as the distance from the surface increases. In the case of the film of the present invention, a depth at which the particle concentration becomes half the maximum value (this depth is larger than a depth at which the particle concentration is maximum value) is obtained and taken as a surface layer thickness. The conditions are as follows.

1) Measurement Device secondary ion mass spectrograph (SIMS)

A-DIDA3000 manufactured by ATOMIKA AG of West Germany

2) Measurement Conditions kind of primary ion: $O_2^+$ acceleration voltage of primary ion: 12 KV current of primary ion: 200 mA luster area: 400 μm □ analysis area: gate 30% degree of measurement vacuum: $5.0 \times 10^{-3}$ Torr

E-GUN: 0.5 KV–3.0 A

In the case where most of the particles contained in an area of up to a depth of 3,000 nm from the surface layer are organic polymer particles, it is difficult to measure them by SIMS. Therefore, the same depth profile as described above may be measured by XPS (X-ray photo-electron spectrograph), IR (infrared spectrograph) or the like while the film is etched from the surface to obtain the thickness of the surface layer. Alternatively, the thickness of the surface layer can be obtained by observing the profile of the layer by an electron microscope to recognize the interface of the layer from changes in particle concentration and contrast.

(5) Friction Coefficient μk of Film

This is measured as follows, using an apparatus shown in FIG. 1. In FIG. 1, reference numeral 1 is a supply reel, 2 a tension controller, 3, 5, 6, 8, 9, and 11 free rollers, 4 a tensiometer (input), 7 a fixing bar made of stainless steel SUS304 (outer diameter: 5 mmφ, surface roughness Ra: 20 nm), 10 a tensiometer (output), 12 a guide roller and 13 a take-up reel.

In an atmosphere at a temperature of 20° C. and a humidity of 60%, the surface of the first layer or the second layer is brought into contact with the fixing bar 7 at an angle θ of (152/180) π radian (152°) and moved (friction) at a speed of 200 cm/min. A tension ($T_2$: g) at the output at the time when the tension controller 2 is adjusted so as to obtain a tension ($T_1$) at the input of 35 g is detected by the output tensiometer after the film runs back and forth 50 times to calculate a running friction coefficient pk from the following equation.

$\mu k = (2.303/\theta) \log(T_2/T_1) = 0.868 \log(T_2/35)$ (6) Output Characteristics Using a noise meter of Shibasoku K. K., the S/N ratio of a magnetic tape for video is measured, and difference between the measured value and the S/N ratio (standard) of the tape of Example 4 shown in Table 1 is obtained. The VTR used is EDV-6000 of Sony Corp.

The magnetic tape is prepared by the following method.

The composition shown below is placed in a ball mill, kneaded for 16 hours and dispersed, and then, 5 parts by weight of an isocyanate compound (Desmodule L of Bayer AG.) is added to the composition. The resulting mixture is sheared and dispersed at a high speed for 1 hour to obtain a magnetic coating.

composition of magnetic coating:

| | |
|---|---|
| needle-like Fe particles | 100 parts by weight |
| vinyl chloride-vinyl acetate copolymer (Eslec 7A of Sekisui Chemical Co., Ltd) | 15 parts by weight |
| thermoplastic polyurethane resin | 5 parts by weight |
| chromium oxide | 5 parts by weight |
| carbon black | 5 parts by weight |
| lecitin | 2 parts by weight |
| aliphatic ester | 1 part by weight |
| toluene | 50 parts by weight |
| methyl ethyl ketone | 50 parts by weight |
| cyclohexanone | 50 parts by weight |

This magnetic coating is applied to one side (second layer) of the biaxially oriented polyester film so as to have a thickness of 2 μm, oriented in a DC magnetic field of 2,500 Gauss and dried by heating at 100° C., and the resulting film is supercalendered (linear pressure of 300 kg/cm, temperature of 80° C.) and rolled up. This roll is left in an oven heated at 55° C. for 3 days and cut into a ½-inch wide piece to obtain a magnetic tape.

(7) Error Rate

Measurement of the error rate was conducted under the following conditions using the ML4500B manufactured by Media Logic Co., Ltd.

| | |
|---|---|
| Current | 15.42 mA |
| Frequency | 0.25 MHz |
| Location | 0 |
| Threshold | 40.0 |
| Bad/good/Max = | 1:1:1 |
| Tracks | 28 |

The number (per tracks) of the error rate shown in Table 2 is an average value of the number of measured tracks (=28).

EXAMPLES 1 and 2

Dimethyl-2,6-naphthalenedicarboxylate and ethylene glycol were mixed with manganese acetate as an ester exchange catalyst, antimony trioxide as a polymerization catalyst, phosphorus acid as a stabilizer and particles shown in Table 1 as a lubricant (inert fine particles) and polymerized by a commonly used method to obtain polyethylene-2,6-naphthalenedicarboxylate (PEN) for the first and second layers having an intrinsic viscosity (in orthochlorophenol, at 35° C.) of 0.61.

The pellets of the polyethylene-2,6-naphthalenedicarboxylate were dried at 170° C. for 6 hours, supplied to the hoppers of two extruders, molten at a melting temperature of 280 to 300° C. and formed into a laminate having the first layer with the second layer thereon using a multi-manifold coextrusion die. The laminate was extruded onto a rotary cooling drum having a surface finishing degree of about 0.3S and a surface temperature of 60° C. to obtain an unstretched laminate film having a thickness of 120 μm.

The thus obtained unstretched laminate film was preheated at 120° C., further heated between low-speed and high-speed rolls from 15 mm above by an IR heater having a surface temperature of 900° C. to be stretched to 4.0 times, quenched, supplied to a stenter, and stretched to 5.0 times in a transverse direction at 145° C. The thus obtained biaxially oriented film was heat-set with hot air heated at 210° C. for 4 seconds to obtain a biaxially oriented laminate polyester film having a thickness of 6.0 μm. The films of Examples 1 and 2 had a Young's modulus in a longitudinal direction of 600 kg/mm$^2$ and a Young's modulus in a transverse direction of 900 kg/mm$^2$. Other characteristics of the films are shown in Table 2.

and dimethyl terephthalate was used in place of dimethyl-2,6-naphthalenedicarboxylate.

After the pellets of the polyethylene terephthalate were dried at 170° C. for 3 hours, an unstretched laminate film was obtained in the same manner as in Examples 1 and 2 (except that the surface temperature of the rotary cooling drum was set to 20° C.).

The thus obtained unstretched laminate film was preheated at 78° C., further heated between low-speed and high-speed rolls from 15 mm above by an IR heater having a surface temperature of 850° C. to be stretched to 2.3 times, quenched, supplied to a stenter, and stretched to 3.6 times in a transverse direction at 110° C. Subsequently, the film was preheated at 110° C., heated between low-speed and high-speed rolls to be stretched to 2.0 times in a longitudinal direction, supplied to a stenter, and stretched to 1.5 times in a transverse direction at 90° C. The thus obtained biaxially oriented film was heat set with hot air heated at 220° C. for 4 seconds to obtain a biaxially oriented laminate polyester film.

This film had a Young's modulus in a longitudinal direction of 600 kg/mm$^2$ and a Young's modulus in a transverse direction of 600 kg/mm$^2$. Other characteristics of the film are shown in Table 2.

The thickness of each layer was adjusted by changing the discharge amounts of the two extruders.

TABLE 1

|  |  | Inert particles in first layer | | | Inert particles in second layer | | |
| --- | --- | --- | --- | --- | --- | --- | --- |
|  | Polyester | Kind of particles | Average of particle diameter (μm) | Content (wt %) | Kind of particles | Average of particle diameter (μm) | Content (wt %) |
| Ex. 1 | PEN | Crosslinked silicone resin particles | 0.05 | 0.05 | spherical silica particles | 0.05 | 0.05 |
| Ex. 2 | PEN | Crosslinked polystyrene particles | 0.05 | 0.05 | spherical silica particles | 0.05 | 0.05 |
| Ex. 3 | PET | spherical silica particles | 0.3 | 0.10 | spherical silica particles | 0.10 | 0.10 |
| Ex. 4 | PET | Crosslinked silicone resin particles | 0.5 | 0.05 | spherical silica particles | 0.10 | 0.10 |
| Ex. 5 | PET | Crosslinked silicone resin particles | 0.5 | 0.03 | spherical silica particles | 0.1 | 0.10 |
|  |  | alumina particles | 0.09 | 0.2 |  |  |  |
| Comp. Ex. 1 | PET | Crosslinked silicone resin particles | 0.3 | 3.00 | none | — | — |
| Comp. Ex. 2 | PET | spherical silica particles | 0.3 | 5.00 | none | — | — |
| Comp. Ex. 3 | PET | spherical silica particles | 0.3 | 10.00 | none | — | — |

Ex.: Example, Comp. Ex.: Comparative Example

EXAMPLES 3 TO 5 AND COMPARATIVE EXAMPLES 1 TO 3

Polyethylene terephthalate (PET) for the first and second layers was obtained in the same manner as in Examples 1 and 2 except that the particles shown in Table 1 were used

TABLE 2

| | Thickness of first layer (μm) | Thickness of second layer (μm) | t/d | WRa (nm) First layer side | WRa (nm) Second layer side | μk$_2$ | μk$_2$/μk$_1$ | Output characteristics | Error rate (per tracks) |
|---|---|---|---|---|---|---|---|---|---|
| Ex. 1 | 2.5 | 3.5 | 5.0 | 9 | 3 | 0.55 | 3 | +1.3 db | 4 |
| Ex. 2 | 2.5 | 3.5 | 5.0 | 9 | 3 | 0.55 | 3 | +1.2 db | 4 |
| Ex. 3 | 3.0 | 3.0 | 10.0 | 6 | 4 | 0.45 | 1.5 | +1 db | 2 |
| Ex. 4 | 3.0 | 3.0 | 6.0 | 9.5 | 4.5 | 0.43 | 1.2 | standard | 2 |
| Ex. 5 | 1.5 | 4.5 | 13.5 | 6.5 | 4.0 | 0.45 | 1.3 | +0.5 db | 3 |
| Comp. Ex. 1 | 1.0 | 8.0 | 3.3 | 13 | 2 | 0.78 | 4.5 | −1.0 db | 20 |
| Comp. Ex. 2 | 1.0 | 8.0 | 3.3 | 11 | 1.5 | 0.80 | 6 | −0.8 db | 35 |
| Comp. Ex. 3 | 0.5 | 8.5 | 1.6 | 7 | 1 | 0.85 | 7 | −0.7 db | 36 |

Ex.: Example
Comp. Ex.: Comparative. Example

As is apparent from Table 2, films of the present invention have excellent output characteristics.

According to the present invention, it is possible to provide a biaxially oriented laminate polyester film which improves the running stability of a magnetic tape and output characteristics thereof. This polyester film is useful as a base film for a magnetic recording medium, particularly for a magnetic tape such as a ½-inch video tape, 8 mm video tape, data cartridge tape or digital video tape.

What is claimed is:

1. A biaxially oriented laminated polyester film comprising a first layer of an aromatic polyester containing inert fine particles having an average particle diameter of 1.0 μm or less in an amount of 0.01 to 2% by weight and a second layer of an aromatic polyester, having a thickness of 2 to 8 μm, wherein:
   (a) the ratio (t/d) of the thickness t (μm) of the first layer to the average particle diameter d (μm) of the inert fine particles is 5 to 30;
   (b) the exposed surface of the first layer has a dynamic friction coefficient (μk$_1$) against a metal of 0.15 to 0.50, and the exposed surface of the second layer has a dynamic friction coefficient (μk$_2$) against a metal of 0.24 to 0.60, and the ratio μk$_2$/μk$_1$ is 1.2 to 4.0; and
   (c) the film has a Young's modulus of 400 to 2,000 kg/mm$^2$ in both the longitudinal and transverse directions.

2. The biaxially oriented laminate polyester film of claim 1, wherein the inert fine particles contained in the aromatic polyester of the first layer are formed from a plurality of different molecular structures.

3. The biaxially oriented laminate polyester film of claim 1, wherein the inert fine particles contained in the aromatic polyester of the first layer are formed from a single molecular structure and have a plurality of peaks in a particle size distribution.

4. The biaxially oriented laminate polyester film of claim 1, wherein the content of the inert fine particles in the aromatic polyester of the first layer is 0.05 to 1% by weight.

5. The biaxially oriented laminate polyester film of claim 1, wherein the ratio (t/d) of the thickness t of the first layer to the average particle diameter d of the inert fine particles is 11 to 25.

6. The biaxially oriented laminate polyester film of claim 1, wherein the thickness of the first layer is in the range of 0.5 to 3 μm.

7. The biaxially oriented laminate polyester film of claim 1, wherein the aromatic polyester of the second layer contains inert fine particles having an average particle diameter of 0.005 to 1 μm in an amount of 0.001 to 0.3% by weight.

8. The biaxially oriented laminate polyester film of claim 1, wherein the thickness of the second layer is in the range of 1.0 to 7.5 μm.

9. The biaxially oriented laminate polyester film of claim 1, wherein the 3-D center plane average roughness WRa$^1$ of the exposed surface of the first layer is in the range of 4 to 10 nm and the 3-D center plane average roughness WRa$^2$ of the exposed surface of the second layer is in the range of 0.1 to 7 nm.

10. The biaxially oriented laminate polyester film of claim 1 whose Young's modulus in a longitudinal direction is the same or larger than Young's modulus in a transverse direction.

11. The biaxially oriented laminate polyester film of claim 1 whose Young's modulus in a transverse direction is larger than Young's modulus in a longitudinal direction.

12. The biaxially oriented laminate polyester film of claim 1 in which the Young's modulus of a longitudinal direction is 400 to 900 Kg/mm$^2$ and the Young's modulus of a transverse direction is 550 to 1500 Kg/mm$^2$.

13. A magnetic tape comprising the biaxially oriented laminate polyester film of claim 1 and a magnetic layer formed on the second layer of the film.

14. The magnetic tape of claim 13, wherein the magnetic layer is a coated layer.

15. A method of digital recording comprising recording on the magnetic tape of claim 13.

16. The method of claim 15, wherein the recording is carried out on linear tracks.

* * * * *